(12) United States Patent
Paez

(10) Patent No.: US 10,029,591 B1
(45) Date of Patent: Jul. 24, 2018

(54) VENTILATED SEAT PAD FOR A VEHICLE SEAT

(71) Applicant: Sergio Paez, Leominster, MA (US)

(72) Inventor: Sergio Paez, Leominster, MA (US)

( * ) Notice: Subject to any disclaimer, the term of this patent is extended or adjusted under 35 U.S.C. 154(b) by 0 days.

(21) Appl. No.: 15/426,163

(22) Filed: Feb. 7, 2017

(51) Int. Cl.
  *A47C 7/74* (2006.01)
  *B60N 2/56* (2006.01)
  *B60N 2/64* (2006.01)

(52) U.S. Cl.
  CPC ............ *B60N 2/5628* (2013.01); *B60N 2/64* (2013.01)

(58) Field of Classification Search
  CPC .. B60N 2/5657; B60N 2/5642; B60N 2/5621; A47C 7/744; A47C 7/74; B60H 1/00285
  USPC ...................................................... 297/180.11
  See application file for complete search history.

(56) References Cited

U.S. PATENT DOCUMENTS

| | | |
|---|---|---|
| 4,853,992 A | 8/1989 | Yu |
| 4,981,324 A | 1/1991 | Law |
| 4,997,230 A * | 3/1991 | Spitalnick ................ A47C 7/74 297/180.11 |
| 5,004,294 A | 4/1991 | Lin |
| 5,370,439 A | 12/1994 | Lowe |
| 5,613,729 A * | 3/1997 | Summer, Jr. ............. A47C 7/74 297/180.11 |
| 5,613,730 A | 3/1997 | Buie |
| 5,715,695 A | 2/1998 | Lord |
| 5,921,858 A | 7/1999 | Kawai |
| 5,924,767 A | 7/1999 | Pietryga |
| 6,079,781 A | 6/2000 | Tilley |

FOREIGN PATENT DOCUMENTS

EP 2644418 A2 10/2013

* cited by examiner

*Primary Examiner* — Shin H Kim
(74) *Attorney, Agent, or Firm* — Kyle A. Fletcher, Esq.

(57) ABSTRACT

The ventilated seat pad for a vehicle seat is placed between the seat of the vehicle and the person sitting on the seat. The ventilated seat pad for a vehicle seat is formed with a foraminous surface. Air flow generated from the vehicle ventilation system is diverted into the ventilated seat pad for a vehicle seat and flows through the foraminous surface on to the person sitting in the vehicle seat. The ventilated seat pad for a vehicle seat comprises one or more cushions and one or more vent attachments. Each of the one or more vent attachments attaches an individual cushion selected from the one or more cushions to the ventilation system of the vehicle such that air flows from the ventilation system into the selected individual cushion.

15 Claims, 6 Drawing Sheets

VENTILATED SEAT PAD FOR A VEHICLE SEAT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of personal and domestic articles including furniture, more specifically, an accessory for chairs, sofas, or beds not otherwise provided for.

SUMMARY OF INVENTION

The ventilated seat pad for a vehicle seat is a supplemental cushion that is configured for use on a seat of a vehicle. The ventilated seat pad for a vehicle seat is adapted for use with a person. The vehicle is further defined with a ventilation system. The ventilated seat pad for a vehicle seat is placed between the seat of the vehicle and the person sitting on the seat. The ventilated seat pad for a vehicle seat is formed with a foraminous surface. The foraminous surface is a plurality of holes formed through an exterior surface of the ventilated seat pad for a vehicle seat that is proximal to the person. Air flow generated from the vehicle ventilation system is diverted into the ventilated seat pad for a vehicle seat and flows through the foraminous surface on to the person sitting in the vehicle seat. The ventilated seat pad for a vehicle seat comprises one or more cushions and one or more vent attachments. Each of the one or more vent attachment attaches an individual cushion selected from the one or more cushions to the ventilation system of the vehicle such that air flows from the ventilation system into the selected individual cushion.

These together with additional objects, features and advantages of the ventilated seat pad for a vehicle seat will be readily apparent to those of ordinary skill in the art upon reading the following detailed description of the presently preferred, but nonetheless illustrative, embodiments when taken in conjunction with the accompanying drawings.

In this respect, before explaining the current embodiments of the ventilated seat pad for a vehicle seat in detail, it is to be understood that the ventilated seat pad for a vehicle seat is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the ventilated seat pad for a vehicle seat.

It is therefore important that the claims be regarded as including such equivalent construction insofar as they do not depart from the spirit and scope of the ventilated seat pad for a vehicle seat. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
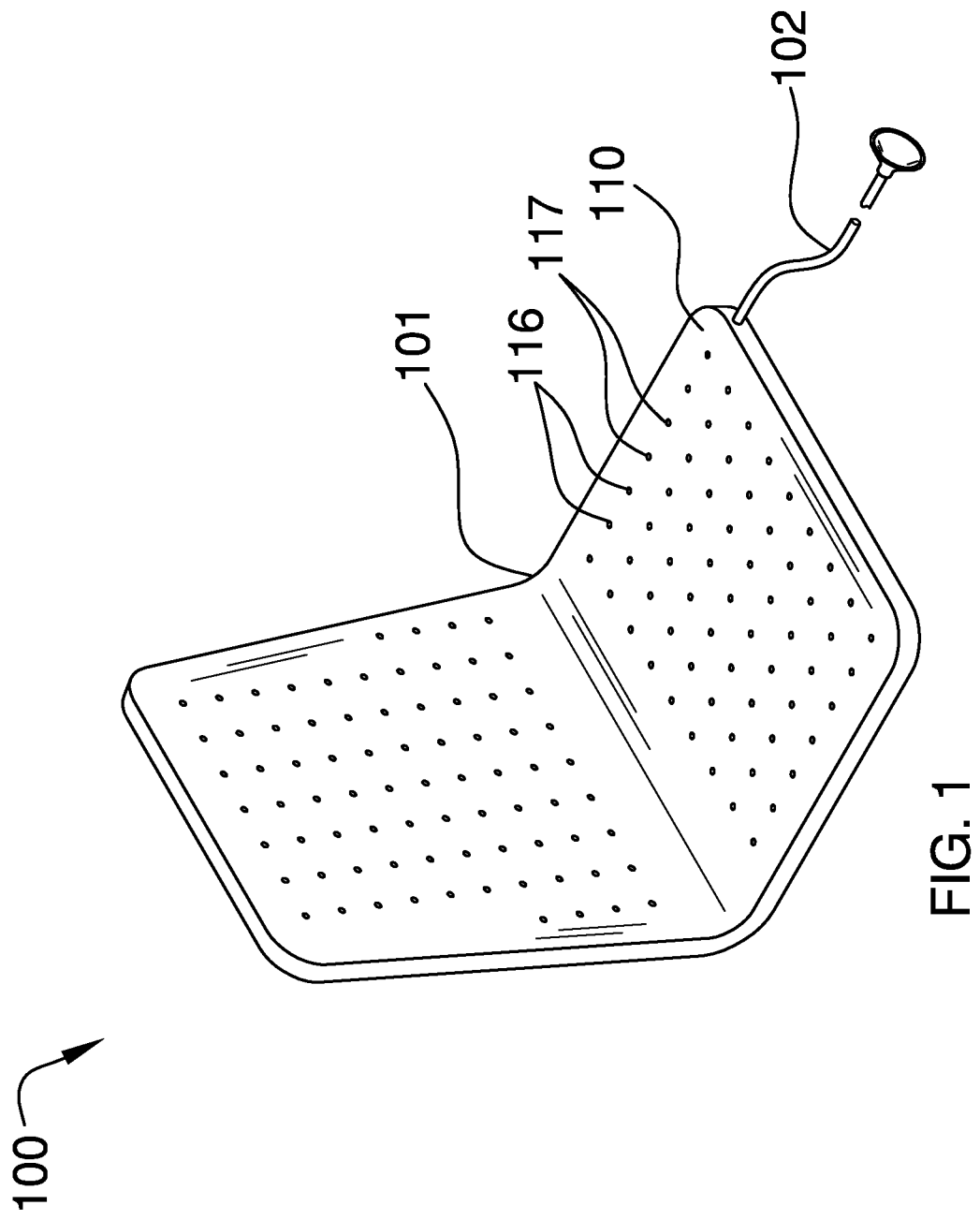
FIG. 1 is a perspective view of an embodiment of the disclosure.
Figure 2:
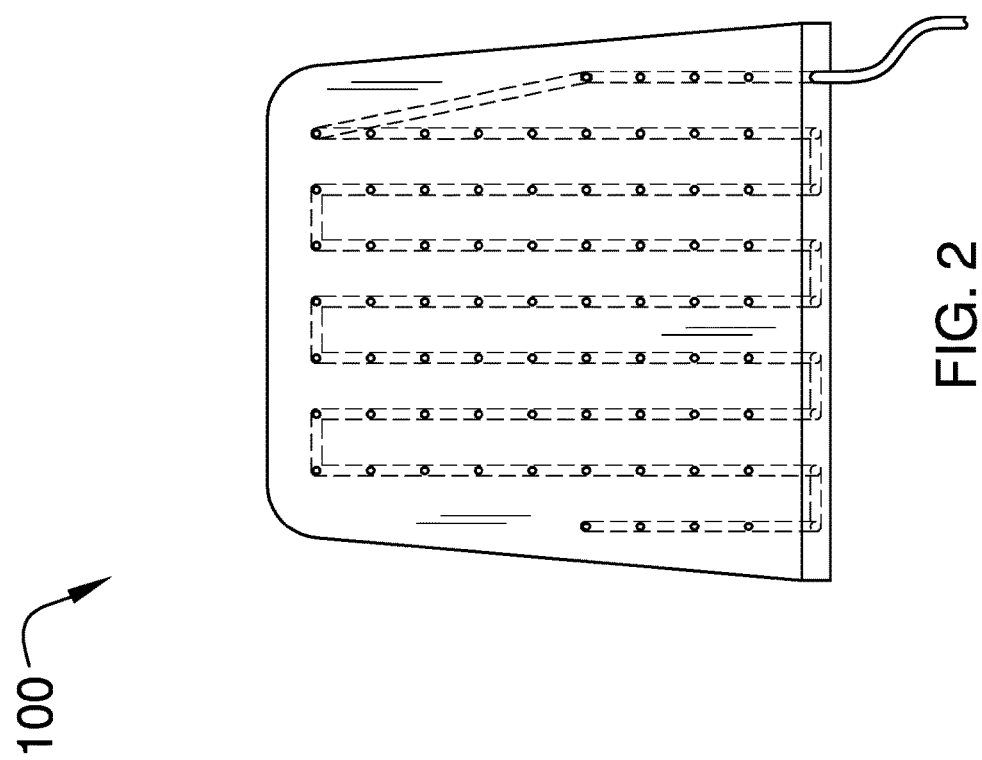
FIG. 2 is a front view of an embodiment of the disclosure.
Figure 3:
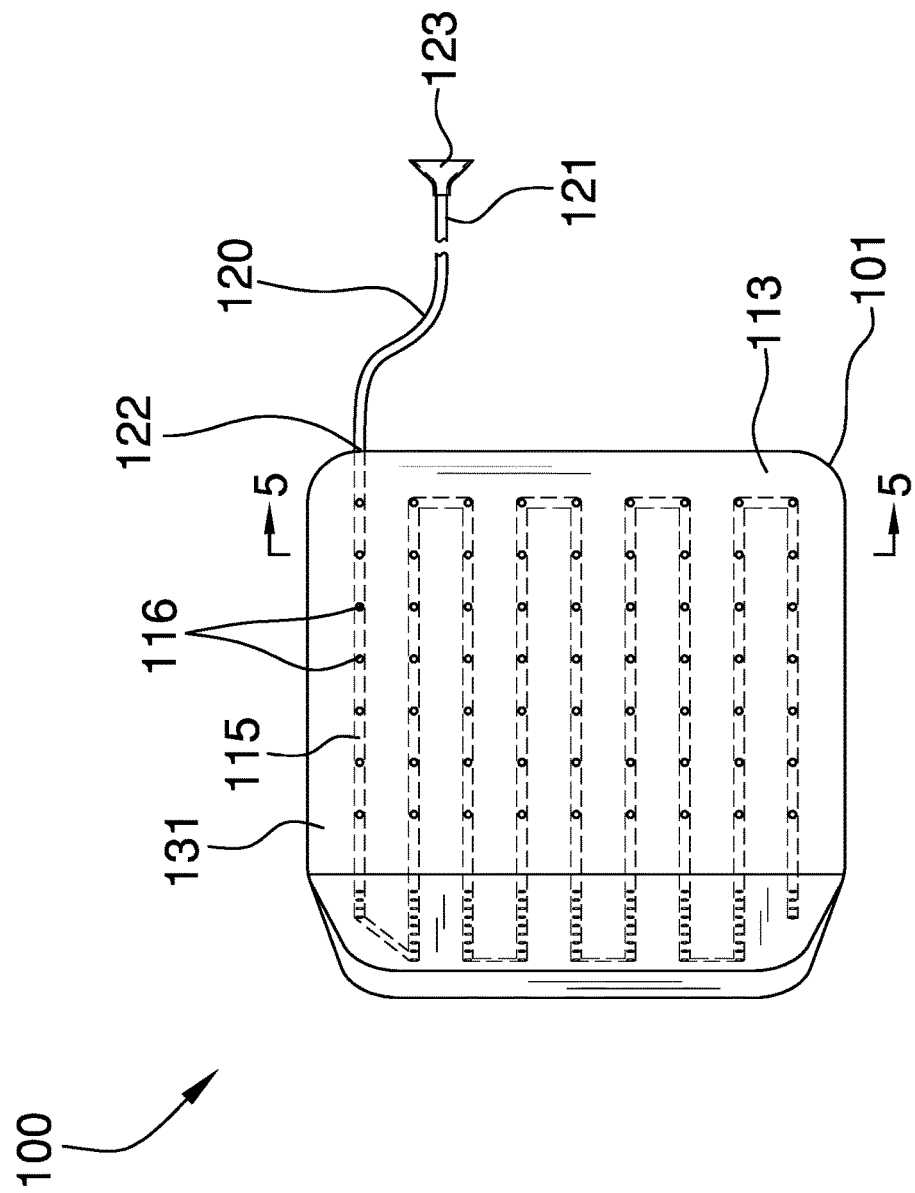
FIG. 3 is a top view of an embodiment of the disclosure.
Figure 4:
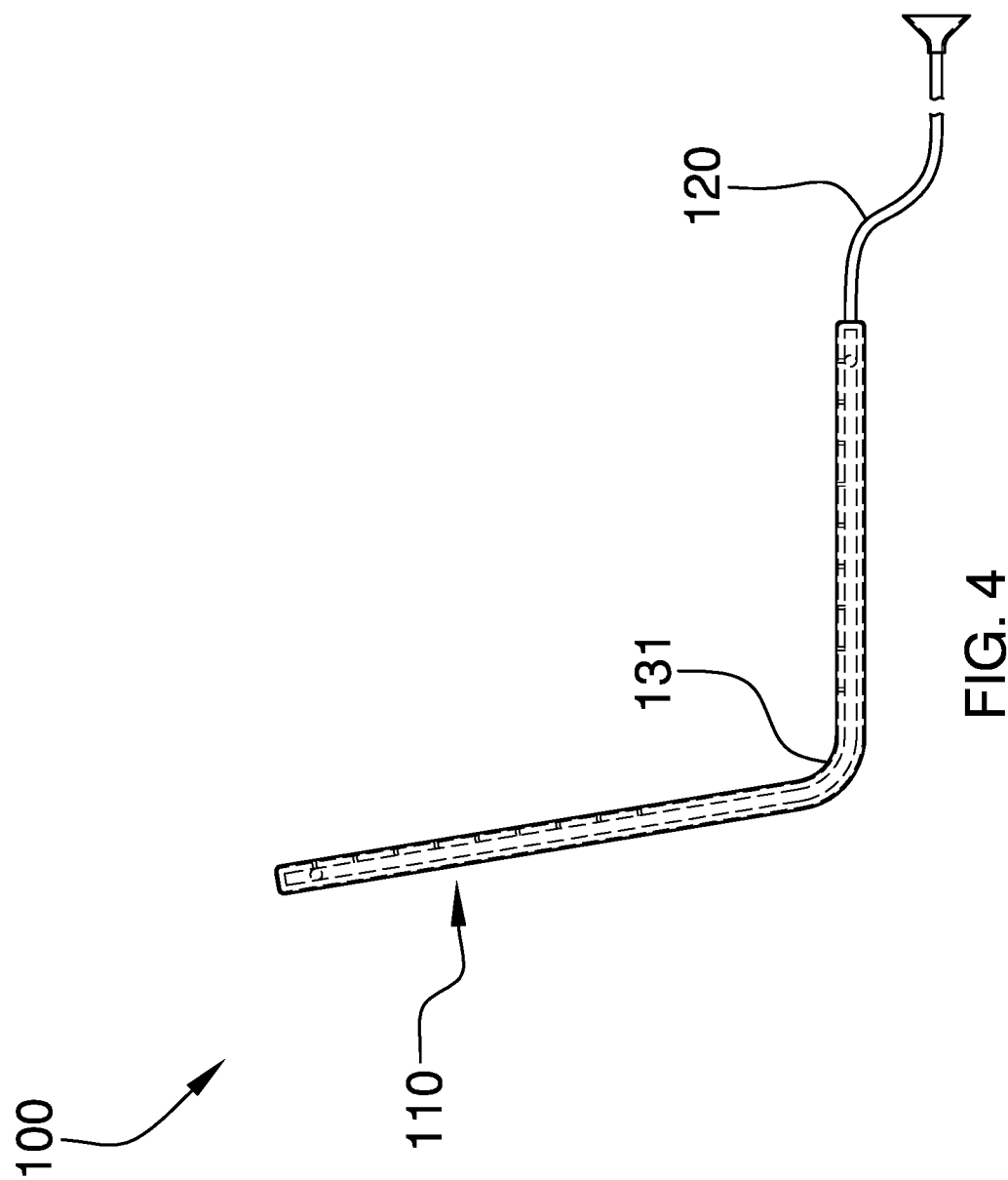
FIG. 4 is a side view of an embodiment of the disclosure.
Figure 5:
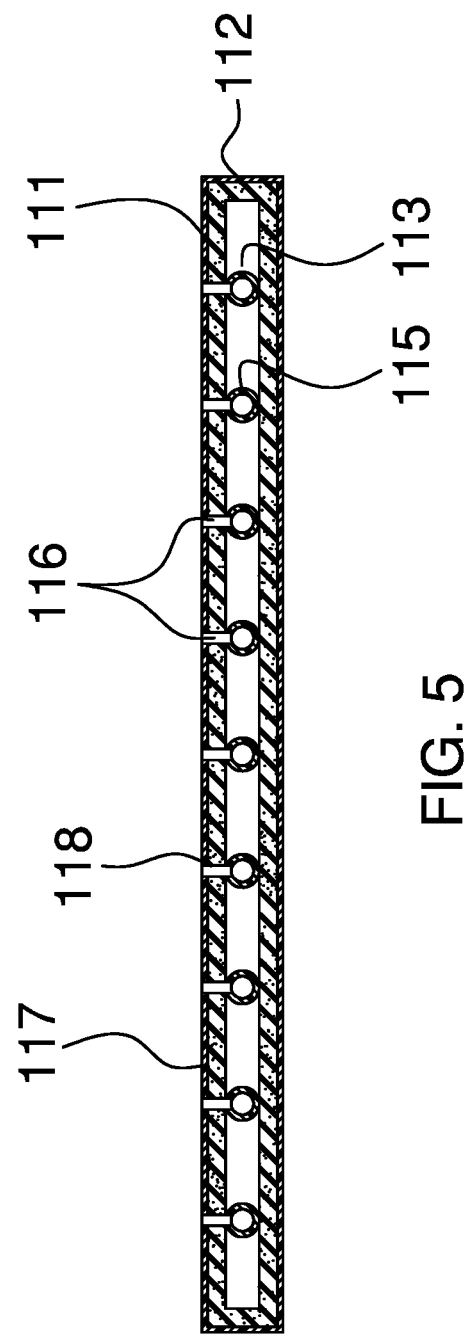
FIG. 5 is a cross-sectional view of an embodiment of the disclosure across 5-5 as shown in FIG. 3.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 6.

The ventilated seat pad for a vehicle seat 100 (hereinafter invention) is a supplemental cushion that is configured for use on a seat 161 of a vehicle 162. The seat 161 is a structure formed within the vehicle 162 in which a person can rest in a sitting position. The vehicle 162 is a motorized device that is used to transport people and goods over a road network. The invention 100 is adapted for use with a person. The vehicle 162 is further defined with a ventilation system 163. The ventilation system 163 is a system contained within the vehicle 162 that provides a conditioned air flow through the vehicle 162. The invention 100 is placed between the seat 161 of the vehicle 162 and the person sitting on the seat 161. The invention 100 is formed with a foraminous surface 117. The foraminous surface 117 is a plurality of holes formed through an exterior surface of an individual cushion 110 selected from the one or more cushions 101 that is proximal to the person.

Air flow generated from the vehicle 162 ventilation system 163 is diverted into the invention 100 and flows through the foraminous surface 117 on to the person sitting in the vehicle 162 seat 161. The invention 100 comprises one or more cushions 101 and one or more vent attachments 102. Each of the one or more vent attachments 102 attaches an individual cushion 110 selected from the one or more cushions 101 to the ventilation system 163 of the vehicle 162 such that air flows from the ventilation system 163 into the selected individual cushion 110.

Each of the one or more cushions 101 is a pad that is placed on the seat 161 of the vehicle 162. Each of the one or more cushions 101 is an individual cushion 110. Within this disclosure, two or more individual cushions 110 selected from the one or more cushions 101 may be joined together to form a larger joined cushion 114. The two or more individual cushion 110 are attached to each other in such a manner that the joined cushion 114 will fit more closely to the seat 161 of the vehicle 162. Each of the individual cushion 110 is a padded panel that either: 1) is used as a cushion that is placed directly upon the vehicle 162 seat 161; or, 2) is joined with other individual cushions 110 selected from the one or more cushions 101 to form a joined cushion 114.

Each individual cushion 110 comprises a casing 111, a foam layer 112, and a tubing structure 113. The casing 111 is an outer covering that forms the exterior surface of the individual cushion 110.

The foam layer 112 is semi-rigid structure with an elastic nature. The foam layer 112 is formed as a solid rectangular foam block. The foam layer 112 is used as the padding material contained within the casing 111 of the individual cushion 110.

The elastic nature of the semi-rigid structure of the foam layer 112 allows the foam layer 112 to be bent to fit the contour of the seat 161 and to subsequently return to its relaxed shape after the individual cushion 110 has been removed from the seat 161.

The tubing structure 113 is a distribution network that is formed within the foam layer 112. The tubing structure 113 transports the air diverted from the ventilation system 163 through the foam layer 112 and eventually discharges the diverted air from the individual cushion 110. The tubing structure 113 comprises a routing tube 115 and a plurality of nozzles 116.

The routing tube 115 is a capped tube. Air diverted into the routing tube 115 enters through the open end of the routing tube 115. The routing tube 115 is a hairpin tube structure that is implanted within the foam layer 112. The routing tube 115 is the physical structure that transports the air diverted from the ventilation system 163 through the foam layer 112.

Each of the plurality of nozzles 116 is a nozzle that projects perpendicularly away from the routing tube 115 in the direction towards the foraminous surface 117. Each of the plurality of nozzles 116 is a hollow cylindrical structure 118. The hollow cylindrical structure 118 is a tube that attaches to and projects away from the routing tube 115 in the manner of a cantilever. As shown most clearly in FIG. 5, each of the plurality of nozzles 116 projects through the casing 111 such that the free end of each of the of the plurality of nozzles 116 forms a hole within the foraminous surface 117 of the individual cushion 110. The air diverted into the routing tube 115 is discharged through the plurality of nozzles 116.

The tubing structure 113 forms a foraminous surface 117 on an exterior surface of the individual cushion 110. The foraminous surface 117 is the surface of the individual cushion 110 through which each hollow cylindrical structure 118 selected from the plurality of nozzles 116 projects to form the holes of the foraminous surface 117. The foraminous surface 117 is the surface of the individual cushion 110 that is distal from the surface of the seat 161 when the invention 100 is used normally.

The individual cushion 110 is formed as follows. The tubing structure 113 is placed in a mold into which a polyurethane foam is injected such that the polyurethane foam encases the tubing structure 113 with the exception of the free end of each of the plurality of nozzles 116 which are kept free of obstruction. Once the combined foam layer 112 and tubing structure 113 is formed, the combined structure is encased within the casing 111. The casing 111 is wrapped around the combined structure such that the free end of each of the plurality of nozzles 116 punches through the casing 111 in order to: 1) create the foraminous surface 117, and 2) to provide an escape path for the diverted air.

Each of the one or more vent attachments 102 attaches an individual cushion 110 to the ventilation system 163 of the vehicle 162. The one or more vent attachments 102 diverts and transports air from the ventilation system 163 to the individual cushion 110 such that the diverted air will be discharged from the individual cushion 110. There is a one to one correspondence between any individual cushion 110 selected from the one or more cushions 101 and an individual vent attachment 120 selected from the one or more vent attachments 102.

The individual vent attachment 120 is a device that attaches the tubing structure 113 of the individual cushion 110 to the ventilation system 163 of the vehicle 162. Each of the one or more vent attachments 102 is an individual vent attachment 120. Each individual vent attachment 120 comprises a hose 121, a cushion connection 122, and a ventilation connection 123.

The hose 121 is a commercially available device that transports the diverted air from the ventilation system 163 to the routing tube 115. The cushion connection 122 is a commercially available connecting device that attaches a first end of the hose 121 to the open end of the routing tube 115. The ventilation connection 123 is a funnel shaped connector that is placed around a vent selected from the ventilation system 163 of the vehicle 162 for the purpose of diverting air into the invention 100. As shown most clearly in FIG. 6, when the one or more cushions 101 are formed a joined cushion 114, the individual vent attachments 120 associated each of the individual cushions 110 that form the joined cushion 114 can be configured to share a single vent connection 123. This is discussed in more detail elsewhere in this disclosure.

In the first potential embodiment of the disclosure, the one or more cushions 101 comprises a primary cushion 131. The primary cushion 131 is a rectangular individual cushion 110 that is intended to cover the seat 161 of the vehicle 162. As shown most clearly in FIG. 1, the primary cushion 131 is folded in in order to conform to the seat 161 of the vehicle 162.

In the first potential embodiment of the disclosure, the ventilation connection 123 is formed from an elastic sheeting that will grip the vent when the elastic sheeting returns to its relaxed shape.

In the first potential embodiment of the disclosure, the tubing structure 113 comprises elastic tubing.

In a second potential embodiment of the disclosure, the one or more cushions 101 comprises a joined cushion 114. The joined cushion 114 further comprises a horizontal cushion 132, an inferior cushion 133, and a superior cushion 134.

Figure 6:
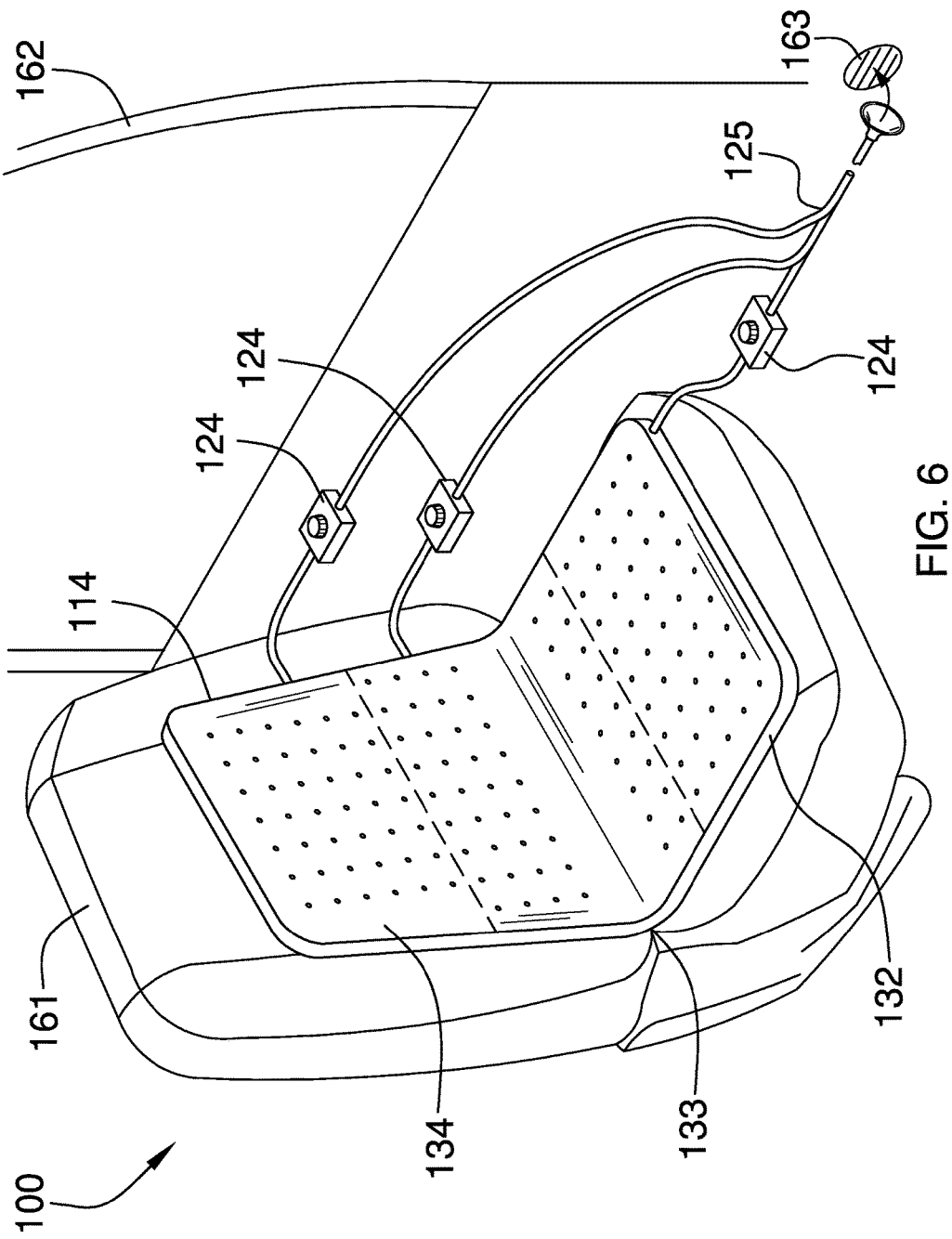
FIG. 6 is a perspective view of an alternate embodiment of the disclosure.

As shown most clearly in FIG. 6, the horizontal cushion 132 is an individual cushion 110 that is used in the formation of the joined cushion 114. The horizontal cushion 132 is placed on the horizontal surface of the seat 161 upon which the buttocks of a person rests. The inferior cushion 133 is an individual cushion 110 that is used in the formation of the joined cushion 114. The inferior cushion 133 covers the lower portion of the backrest of the seat 161. The superior cushion 134 is an individual cushion 110 that is used in the formation of the joined cushion 114. The superior cushion 134 covers the upper portion of the backrest of the seat 161. The inferior cushion 133 attaches to both the horizontal cushion 132 and the superior cushion 134. The inferior cushion 133 is joined to the horizontal cushion 132 and the superior cushion 134 using sewn seams.

Each individual cushion 110 contained within the joined cushion 114 is connected to the ventilation system 163. In the second potential embodiment of the disclosure, each individual vent attachment 120 contained within a joined cushion 114 further comprises a valve 124. The valve 124 controls the flow of the diverted air from the ventilation system 163 through the hose 121 into the open end of the routing tube 115.

As shown most clearly in FIG. 6, the ventilation connection 123 of each of the individual ventilation attachments 120 associated with the horizontal cushion 132, the inferior cushion 133, and superior cushion 134 form a shared fluidic connection 125 with a single ventilation connection 123 that attaches to the ventilation system 163 at a single vent.

In the second potential embodiment of the disclosure, the tubing structure 113 comprises materials selected from the group consisting of an elastic tubing, a rigid tubing, or a semi-rigid tubing.

The following definitions were used in this disclosure:

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Tube: As used in this disclosure, a capped tube is a tube with one closed end and one open end.

Correspond: As used in this disclosure, the term correspond means that a first object is in some manner linked to a second object in a one to one relationship.

Cushion: As used in this disclosure a cushion is a pad or pillow formed from soft material that is used for resting, sleeping, or reclining.

Elastic: As used in this disclosure, an elastic is a material or object that deforms when a force is applied to it and that is able to return to its original shape after the force is removed. A material that exhibits these qualities is also referred to as an elastomeric material.

Exterior: As used in this disclosure, the exterior is use as a relational term that implies that an object is not contained within the boundary of a structure or a space.

Foam: As used in this disclosure, foam is a mass of gas filled spaces, commonly referred to as bubbles, which can be formed: 1) on or in a liquid or gel; or, 2) in a solid material.

Foraminous: As used in this disclosure, foraminous is an adjective that describes a surface, plate, or platform that is perforated with a plurality of holes.

Hairpin Tube: As used in this disclosure, a hairpin tube is a tube or pipe structure wherein tube or pipe is bent in a "U" shape reminiscent of a hairpin turn. This "U" reverses the actual physical direction of fluid flow while maintaining the direction of the fluid flow through the tube. Hairpin tube structures are often used in heat exchangers.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Hose: As used in this disclosure, a hose is a flexible hollow cylindrical device that is used for transporting liquids and gases. When referring to a hose in this disclosure, the terms inner diameter and outer diameter are used as they would be used by those skilled in the plumbing arts.

Inferior: As used in this disclosure, the term inferior refers to a directional reference that is parallel to and in the same direction as the force of gravity.

Interior: As used in this disclosure, the interior is use as a relational term that implies that an object is contained within the boundary of a structure or a space.

Nozzle: As used in this disclosure, a nozzle is a device that receives liquid or gas under pressure and disperses that liquid or gas into the atmosphere.

One to One: When used in this disclosure, a one to one relationship means that a first element selected from first set is in some manner connected to only one element of a second set. A one to one correspondence means that the one to one relationship exists both from the first set the second set and from the second set to the first set. A one to one fashion means that the one to one relationship exists in only one direction.

Pad: As used in this disclosure, a pad is a mass of soft material used as a filling or for protection against damage or injury. Commonly used padding materials include, but are not limited to, polyurethane foam, a polyester fill often referred to as fiberfill or polystyrene beads often referred to as stuffing beans or as bean bag chair beans.

Relaxed Shape: As used in this disclosure, a structure is considered to be in its relaxed state when no shear, strain, or torsional forces are being applied to the structure.

Semi-Rigid Structure: As used in this disclosure, a semi-rigid structure is a solid structure that is stiff but not wholly inflexible and that will deform under force before breaking. A semi-rigid structure may or may not behave in an elastic fashion in that a semi-rigid structure need not return to a relaxed shape.

Sewn Seam: As used in this disclosure, a sewn seam a method of attaching two or more layers of textile, leather, or other material through the use of a thread, a yarn, or a cord that is repeatedly inserted and looped through the two or more layers of textile, leather, or other material.

Sheeting: As used in this disclosure, sheeting is a material, such as a textile, a plastic, or a metal foil, in the form of a thin flexible layer or layers.

Superior: As used in this disclosure, the term superior refers to a directional reference that is parallel to and in the opposite direction of the force of gravity.

Tube: As used in this disclosure, a tube is a hollow cylindrical device that is used for transporting liquids and gases. The line that connects the center of the first base of the cylinder to the center of the second base of the cylinder is referred to as the center axis of the tube or the centerline of the tube. In this disclosure, the terms inner dimension of a tube and outer dimension of a tube are used as they would be used by those skilled in the plumbing arts.

Vehicle: As used in this disclosure, a vehicle is a motorized device that is used transporting carrying passengers, goods, or equipment. The term motorized refers to a vehicle can move under power provided by an electric motor or an internal combustion engine.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A ventilated seat pad comprising:
one or more cushions and one or more vent attachments;
wherein each of the one or more vent attachments attaches to an individual cushion selected from the one or more cushions;
wherein the ventilated seat pad is a cushion;
wherein the is configured for use on a seat of a vehicle;
wherein the vehicle is further defined with a ventilation system;
wherein the ventilation system is a system contained within the vehicle that provides a conditioned air flow through the vehicle;
wherein the ventilation system is further defined with a vent;
wherein each of the one or more vent attachments attaches an individual cushion selected from the one or more cushions to the ventilation system of the vehicle;
wherein the ventilated seat pad is adapted for use with a person;
wherein the ventilated seat pad is placed between the seat of the vehicle and the person sitting on the seat;
wherein the ventilated seat pad is formed with a foraminous surface;
wherein the foraminous surface is proximal to the person;
wherein air flow generated from the vehicle ventilation system is diverted into the ventilated seat pad and flows through the foraminous surface on to the person sitting in the vehicle seat;
wherein each of the individual cushion selected form the one or more cushions is a padded panel;
wherein each individual cushion comprises a casing, a foam layer, and a tubing structure;
wherein the tubing structure is contained within the foam layer;
wherein the casing encloses the foam layer;
wherein the tubing structure forms the plurality of holes that form the foraminous surface;
wherein the casing is an outer covering that forms the exterior surface of the individual cushion;
wherein the foam layer is semi-rigid structure with an elastic nature;
wherein the foam layer is formed as a solid rectangular foam block;
wherein the foam layer is bendable;
wherein the tubing structure is a distribution network;
wherein the tubing structure distributes the air diverted from the ventilation system through the foam layer and discharges the diverted air from the individual cushion;
wherein the tubing structure comprises a routing tube and a plurality of nozzles;
wherein the routing tube is a capped tube;
where the capped tube;
wherein the routing tube is further defined with an open end and a closed end;
wherein air diverted into the routing tube enters through the open end of the routing tube;
wherein the routing tube is a hairpin tube structure that is implanted within the foam layer;
wherein the routing tube is contained within the foam layer.

2. The ventilated seat pad according to claim 1
wherein each of the plurality of nozzles is a hollow cylindrical structure;
wherein the hollow cylindrical structure is a tube that attaches to and projects away from the routing tube in the manner of a cantilever;
wherein the hollow cylindrical structure is further defined with a free end and a fixed end;
wherein each of the plurality of nozzles projects perpendicularly away from the routing tube in the direction towards the foraminous surface.

3. The ventilated seat pad according to claim 2
wherein each of the plurality of nozzles projects through the casing such that the free end of each of the of the plurality of nozzles forms a hole within the foraminous surface of the individual cushion;
wherein the foraminous surface is the surface of the individual cushion through which the free end each hollow cylindrical structure selected from the plurality of nozzles projects to form the holes of the foraminous surface;
wherein the foraminous surface is the surface of the individual cushion that is distal from the surface of the seat.

4. The ventilated seat pad according to claim 3 wherein the air diverted into the routing tube is discharged through the plurality of nozzles.

5. The ventilated seat pad according to claim 4
wherein each of the one or more vent attachments is an individual vent attachment;
wherein any individual cushion selected from the one or more cushions is associated with an individual vent attachment selected from the one or more vent attachments;
wherein the individual vent attachment is a device that attaches the tubing structure of the individual cushion to the ventilation system of the vehicle.

6. The ventilated seat pad according to claim 5
wherein each individual vent attachment comprises a hose, a cushion connection, and a ventilation connection;

wherein the cushion connection attaches to a first end of the hose;

wherein the ventilation connection attaches to a second end of the hose.

7. The ventilated seat pad according to claim 6 wherein the hose is a device that transports the diverted air from the ventilation system to the routing tube.

8. The ventilated seat pad according to claim 7 wherein the cushion connection is a device that connects a first end of the hose to the open end of the routing tube.

9. The ventilated seat pad according to claim 8 wherein the ventilation connection is a funnel shaped connector that is placed around the vent.

10. The ventilated seat pad according to claim 9
wherein the ventilation connection is formed from an elastic sheeting;
wherein the will grip the vent when the elastic sheeting returns to its relaxed shape.

11. The ventilated seat pad according to claim 10
wherein the one or more cushions comprises a primary cushion;
wherein the primary cushion is a rectangular shape;
wherein the primary cushion is folded in in order to conform to the seat of the vehicle;
wherein the tubing structure comprises elastic tubing.

12. The ventilated seat pad according to claim 11
wherein the foam layer is formed from a polyurethane foam;
wherein the tubing structure is placed in a mold into which the polyurethane foam;
wherein the polyurethane foam is injected into the mold such that the polyurethane foam encases the tubing structure with the exception of the free end of each of the plurality of nozzles such that the free end of each of the plurality of nozzles are kept free of obstruction;
wherein once the combined foam layer and tubing structure is formed, the combined structure is encased within the casing;
wherein the casing is wrapped around the combined structure such that the free end of each of the plurality of nozzles projects through the casing.

13. The ventilated seat pad according to claim 10
wherein the one or more cushions comprises a joined cushion;
wherein the joined cushion further comprises a horizontal cushion, an inferior cushion, and a superior cushion;
wherein the horizontal cushion is an individual cushion;
wherein the inferior cushion is an individual cushion;
wherein the superior cushion is an individual cushion;
wherein the inferior cushion attaches to both the horizontal cushion and the superior cushion;
wherein each individual cushion contained within the joined cushion is connected to the ventilation system.

14. The ventilated seat pad according to claim 13
wherein each individual vent attachment contained within the joined cushion further comprises a valve;
wherein the valve controls the flow of the diverted air from the ventilation system through the hose into the open end of the routing tube of an individual cushion;
wherein individual vent attachments associated each of the individual cushions that form the joined cushion are configured to share a single vent connection.

15. The ventilated seat pad according to claim 14
wherein the foam layer is formed from a polyurethane foam;
wherein the tubing structure is placed in a mold into which the polyurethane foam;
wherein the polyurethane foam is injected into the mold such that the polyurethane foam encases the tubing structure with the exception of the free end of each of the plurality of nozzles such that the free end of each of the plurality of nozzles are kept free of obstruction;
wherein once the combined foam layer and tubing structure is formed, the combined structure is encased within the casing;
wherein the casing is wrapped around the combined structure such that the free end of each of the plurality of nozzles projects through the casing.

\* \* \* \* \*